Sept. 17, 1968 L. D. JOHNSON 3,402,363

MECHANICALLY ACTUATED ELECTRONIC SWITCH

Filed July 5, 1966

INVENTOR.
Lee D. Johnson
BY
Harris, Dickey + Pierce
ATTORNEYS.

United States Patent Office 3,402,363

Patented Sept. 17, 1968

3,402,363

MECHANICALLY ACTUATED ELECTRONIC SWITCH

Lee D. Johnson, 1322 N. Adams Road, Rochester, Mich. 48063

Filed July 5, 1966, Ser. No. 562,789

14 Claims. (Cl. 331—75)

ABSTRACT OF THE DISCLOSURE

An electronic switch utilizing electronic switching elements coupled to the output of an oscillator circuit which contains a mechanically controlled feedback element for selecting an oscillating or non-oscillating condition, whereby the switching elements are placed in conductive or nonconductive states in response to the condition of the oscillator.

The present invention relates to a mechanically actuated electronic switch, and more specifically, to an electronic switch which is contactless and in which switching is performed by mechanical actuation.

With mechanically actuated contact type switches, the contacts will wear and eventually require replacement. It is an object of the present invention to provide a novel contactless type switch.

It is another object of the present invention to provide an electronic switch which is mechanically actuated for performing a switching function without the use of contacts.

The switch of the present invention, in addition to performing a switching function, is capable of performing multiple switching functions over selective ranges. Therefore, it is an object of the present invention to provide an electronic switch which readily lends itself to multiple switching functions.

Figure 1:
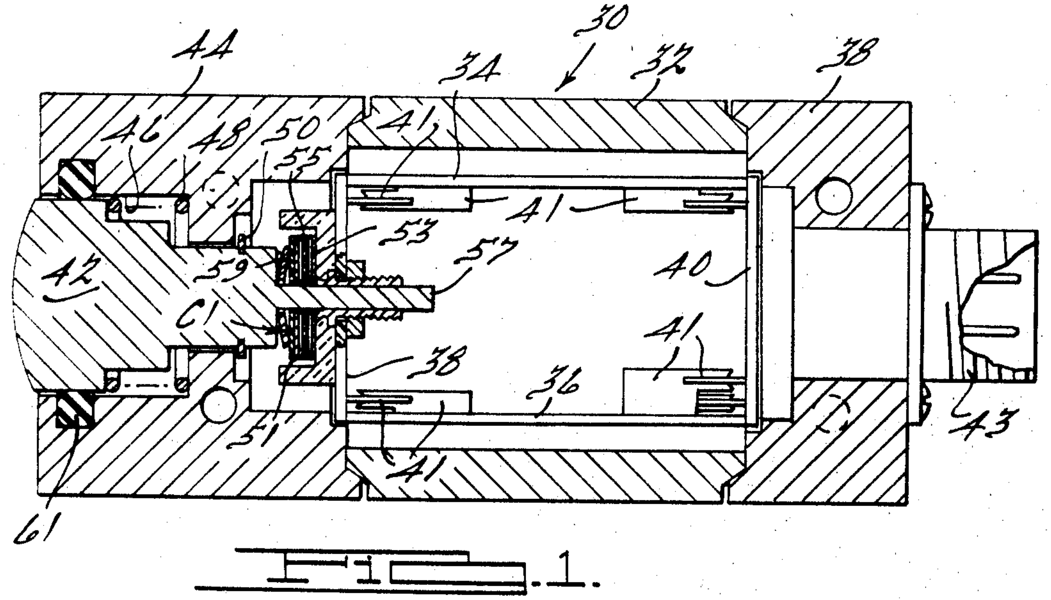
Figure 2:
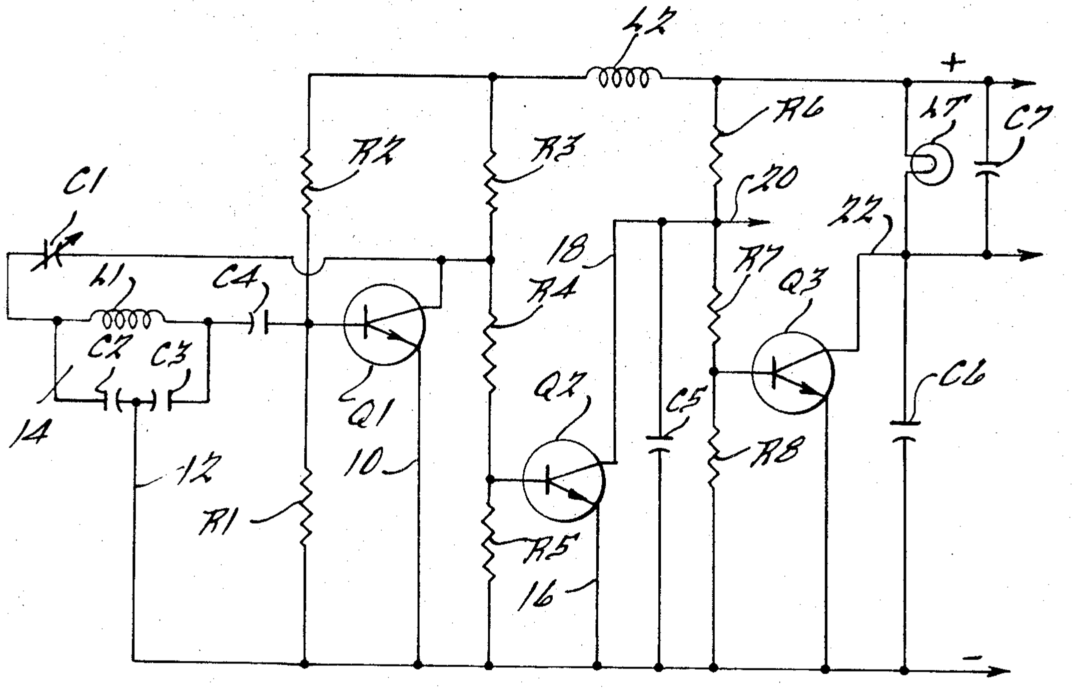

Other objects, features and advantages of the present invention will become apparent from the subsequent description and the appended claims, taken in conjunction with the accompanying drawings, in which:

FIGURE 1 is a side elevational sectional view generally of the mechanical components of one form of the switch of the present invention; and FIGURE 2 is an electrical schematic diagram illustrating one form of the circuit of the switch of the present invention.

Looking now to FIGURE 2, Q1 is an NPN type transistor having base, collector, and emitter electrodes with the base being connected to the positive side of a source of DC potential by means of a resistor R2 and connected to the negative side of the source of DC potential by a resistor R1. The emitter is connected directly to ground or negative potential via a conductor 10. The transistor Q1 has its collector connected to the positive source of potential by means of a resistor R3 and is connected to ground or negative potential through a pair of serially connected resistors R4 and R5. The transistor Q1 is connected for operation as oscillator and hence the collector is connected to the base by means of a feed-back circuit. The collector is connected directly to a variable feedback capacitor C1 which in turn is connected to a tank circuit 14 comprising an inductor L1 and a pair of serially connected capacitors C2 and C3. The tank circuit 14 is coupled to the base of transistor Q1 by means of a coupling capacitor C4. The tank circuit 14 is connected to ground or negative potential by means of a conductor 12 which is connected at the juncture between capacitors C2 and C3.

By varying the magnitude of the capacitor C1, the amount of feed-back to the tank circuit 14 can be controlled. The parameters of the tank circuit 14 are selected with regard to the other parameters of the circuit to provide oscillation of the transistor Q1 at a selected radio frequency.

A first output transistor Q2 is of the NPN type and has its base connected to the juncture of resistors R4 and R5 and has its emitter connected to ground or negative potential by means of a conductor 16 and has its collector connected to the positive terminal by means of a conductor 18 and a resistor R6. A capacitor C5 is connected from the collector to ground and acts as an AC bypass for the selected radio frequency. A choke coil L2 is located between the resistors R3 and R6 and hence generally blocks the oscillations of the oscillator circuit of transistor Q1 from the power supply and from the succeeding circuitry.

The transistor Q1, when it is not in an oscillating condition, will have a higher output impedence than when it is oscillating and hence will provide a varying impedance across the resistors R4 and R5. This output impedence of the circuit of Q1 is such that transistor Q2 will normally be maintained on or conductive when the circuit of transistor Q1 is not in oscillation. When the capacitor C1 is varied to a point where sufficient feed-back is provided to the tank circuit 14 whereby Q1 is placed in oscillation, the output impedence of Q1 is reduced. At this point the resistors R4 and R5 along with the dropping resistor R3 are effective to bias the transistor Q2 off or to render it nonconductive; an output signal can be taken from the collector of Q2 as by the conductor 20. The collector of the transistor Q2 is connected by conductor 18 to the base circuit of another output transistor Q3 which is of the NPN type and which has its base connected to ground or the negative side of the potential by means of a resistor R8 which base is connected to the positive side of the potential by resistors R7 and R6 which are serially connected. The emitter of transistor Q3 is connected to ground and the output from Q3 is taken from the collector by a conductor 22. The transistor Q3 is biased to conduct when transistor Q2 is nonconductive. When the transistor Q2 is conducting, the resistors R7 and R8 in the base circuit of transistor Q3 are shunted whereby the transistor Q3 is maintained nonconductive or off. When transistor Q2 is rendered nonconductive, the transistor Q3 will be rendered conductive; thus, Q3 will have an output signal at conductor 22 which is the inverse of the output signal from transistor Q2 at conductor 18. A capacitor C6 is connected from the collector of Q3 to ground and acts as an AC bypass as does capacitor C7 which is connected from the positive side of the source of potential to the collector of transistor Q3 via conductor 22. An indicating lamp LT is connected from the positive side of the potential to the collector of transistor Q3 via conductor 22 and will be lit when transistor Q3 is conductive hence giving an indication of the conductive condition of the transistor Q3. Note at the same time the condition of light LT will provide an indication of the conductive condition of transistor Q2 since the conductive condition of Q2 will be the inverse of Q3. Note that with the circuit as shown in FIGURE 2, two separate outputs are provided, one at conductor 20 and the other at conductor 22, with one being the inverse of the other. With this circuit arrangement the switch circuit as shown in FIGURE 2 lends itself to operation not only as a switch but also as a logic circuit.

The electrical circuitry of the schematic diagram of FIGURE 2 can be mounted in a mechanical assembly as shown in FIGURE 1 and generally indicated by the numeral 30. The switch assembly 30 contains a main body member 32 in which is supported two side circuit boards 34 and 36 which plug into a front circuit board 38 and a rear circuit board 40. The connectors for electrically and mechanically connecting the boards are of a standard construction and are generally indicated by the number 41. A rear connector body 38 is connected to the rear of the main body 32 and is provided with a conventional plug in type connector 43 whereby the circuit of FIGURE 2 may be energized and its signals taken therefrom. The circuitry as shown in FIGURE 2 is mounted on the circuit boards 34, 36, 38 and 40. The variable capacitor member C1 is a padded capacitor, of conventional construction, and is mounted in a manner to be engaged by an actuating plunger member 42. The plunger member 42 is movably secured to an actuator body assembly 44 which is fixed to the front end of the main body 32. The plunger 42 is supported in a cavity 46 at the front end of the actuator assembly 44 which cavity 46 is of a stepped construction generally following the stepped construction of plunger 42. A spring 48 resiliently urges the plunger 42 to its forward or outermost position with the plunger 42 being retained in the cavity 46 by a snap ring 50. The capacitor C1 has two plates 51 and 53 separated by a dielectric 55; the outer plate 51 is bowed and is normally away from the plate 53 such that the capacity therebetween is slight. A stem 57 of plunger 42 extends through an aperture in capacitor C1 and a shoulder 59 can deflect the outer plate 51 by means of a dished washer and insulator. Thus, when the plunger 42 is moved inwardly the outer plate 51 is deflected towards the plate 53 and the capacity increased and with the plunger 42 at innermost position the magnitude of the capacity will be sufficient to cause the circuit of Q1 to oscillate. When the plunger 42 is released, the spring 44 will cause it to move outwardly again thereby permitting the plates of capacitor C1 to move apart and decrease its capacity whereupon the transistor Q1 will be out of oscillation.

Note that there are no electrical contacts in the switch just shown and described and the switching is provided by the change in the value of the capacitance of capacitor C1 which change is effectuated mechanically by actuation of the plunger 42. An O-ring seal 61 co-operates with plunger 42 and seals the interior of the switch 30 from dirt, etc. The switch, as shown in FIGURES 1 and 2, is rugged and has a long and useful life since the necessity for electrical contacts has been obviated. In order to maintain the size of the components at a minimum, a high operating frequency for the oscillator circuit of transistor Q1 is desirable. It has been found that capacitor C1 and others of the components can be of a relatively small size when the parameters of the oscillator circuit of transistor Q1 are selected to operate at a frequency of 50 megacycles and generally no lower than 2 megacycles.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. An electric switch comprising: oscillator circuit means having one condition in which it is in oscillation and another condition in which it is not in oscillation, said oscillator circuit means comprising an electrical element having an electrical characteristic being selectively variable from one magnitude to another magnitude by mechanical operation and with said oscillator circuit means being responsive to said electrical characteristic having said one magnitude for being placed into electrical oscillation and being responsive to said other magnitude for being placed out of electrical oscillation, actuating means mechanically operative on said electrical element for selectively placing said electrical element into said one or said other magnitude, and switch circuit means responsive to said oscillator circuit means being in said one condition for being in one conductive condition and responsive to said oscillator circuit means being in said other condition for being in a different conductive condition, said oscillator circuit means including a feedback circuit and with said electrical element being connected in said feedback circuit, said oscillator circuit means having an output circuit and having a change in the magnitude of impedance in said output circuit from an oscillating to a non-oscillating condition and with said switch circuit means being connected to said output circuit and including solid state asymmetric current conducting means being electrically actuable between said one conductive condition and said different conductive condition with one of said conductive conditions being substantially non-conductive, said asymmetric means being actuated to said one conductive condition responsively to the impedance of said output circuit having one magnitude and being actuated to said different conductive condition responsively to the impedance of said output circuit having a different magnitude, direct current coupling means connecting said output circuit to said switch circuit means whereby said asymmetric means will be responsive to direct current variations in said output circuit.

2. The switch of claim 1 with said oscillator circuit means including a tank circuit and with said electrical element being a feedback capacitor serially connected to said tank circuit.

3. The switch of claim 2 with said tank circuit tuned to provide oscillations at least as high as approximately two megacycles.

4. An electric switch comprising: oscillator circuit means having one condition in which it is in oscillation and another condition in which it is not in oscillation, said oscillator circuit means including a feedback circuit and a tank circuit and with said feedback circuit including a feedback capacitor serially connected to said tank circuit, said feedback capacitor being selectively variable from one magnitude to another magnitude by mechanical operation and with said oscillator circuit means being responsive to said feedback capacitor having said one magnitude for being placed into electrical oscillation and being responsive to said other magnitude for being placed out of electrical oscillation, actuating means mechanically operative on said feedback capacitor for selectively placing said electrical element into said one or said other magnitude, said feedback capacitor comprising a pair of spaced plates with one of said plates being resiliently deflectable towards and away from the other of said plates whereby changes in magnitude of the capacity can be effectuated and with said actuating means comprising a plunger member selectively movable between two positions and engageable with said one of said plates for deflecting said one of said plates toward and away from said other of said plates as said plunger member is moved between said positions, and switch circuit means responsive to said oscillator circuit means being in said one condition for being in one conductive condition and responsive to said oscillator circuit means being in said other condition for being in a different conductive condition.

5. The switch of claim 4 with said plunger member being spring biased to normally be in one of said positions.

6. The switch of claim 1 with said electrical element being a feedback capacitor having a pair of spaced plates with one of said plates being resiliently deflectable toward and away from the other of said plates whereby changes in magnitude of the capacity can be effectuated and with said actuating means comprising a plunger member selectively movable between two positions and engageable with said one of said plates for deflecting said one of said plates toward and away from said other of said plates as said plunger member is moved between said positions.

7. The switch of claim 1 with said oscillator circuit means comprising a first controlled conduction device having a plurality of electrodes, said output circuit connected across a first pair of said electrodes, said feedback circuit connected across a second pair of said electrodes with said second pair including one of said first pair.

8. The switch of claim 7 with said feedback circuit including a tank circuit and with said electrical element being a feedback capacitor serially connected to said tank circuit, said capacitor being variable over a range including magnitudes placing said oscillator circuit means into and out of oscillation.

9. The switch of claim 8 with said switch circuit means comprising a second controlled conduction device having a plurality of different electrodes, an input circuit connected across two of said different electrodes and connected to said output circuit of said oscillator circuit means, said switch means having a different output circuit connected across a different two of said different electrodes with said different two including one of said two of said different electrodes, whereby the conductive condition of said second controlled conduction device is controlled by changes in impedance of said output circuit of said oscillator circuit means with one of said conductive conditions being conduction and the other being nonconduction.

10. An electric switch comprising: oscillator circuit means having one condition in which it is in oscillation and another condition in which it is not in oscillation, and including a feedback circuit and an output circuit and having a change in the magnitude of impedance in said output circuit from an oscillating to a non-oscillating condition, said oscillator circuit means comprising a tank circuit and a first controlled conduction device having a plurality of electrodes, said output circuit connected across a first pair of said electrodes, said feedback circuit connected across a second pair of said electrodes with said second pair including one of said first pair, said feedback circuit including a feedback capacitor serially connected to said tank circuit, said capacitor having a characteristic selectively, mechanically variable over a range including one magnitude placing said oscillator circuit means into oscillation and another magnitude placing said oscillator circuit means out of oscillation, actuating means mechanically operative on said feedback capacitor for selectively placing said feedback capacitor into said one or said other magnitude, and switch circuit means responsive to said oscillator circuit means being in said one condition for being in said one conductive condition responsively to the oscillator circuit means being in said other condition for being in a different conductive condition, said switch circuit means being connected to said output circuit and being in said one conductive condition responsively to the impedance of said output circuit having one magnitude and being in said different conductive condition responsively to the impedance of said output circuit having a different magnitude, said switch circuit means comprising a second controlled conduction device having a plurality of different electrodes, an input circuit connected across two of said different electrodes and connected to said output circuit of said oscillator circuit means, said switch circuit means having a different output circuit connected across a different two of said different electrodes with said different two including one of said two of said different electrodes, whereby the conductive condition of said second controlled conduction device is controlled by changes in impedance of said output circuit of said oscillator circuit means with one of said conductive conditions being conduction and the other being nonconduction, said switch circuit means comprising a third controlled conduction device electrically connected to said different output circuit and being in conductive and nonconductive conditions responsively to the conductive condition of said second controlled conduction device.

11. An electric switch comprising: oscillator circuit means having one condition in which it is in oscillation and another condition in which it is not in oscillation, said oscillator circuit means including a feedback circuit and an output circuit and having a change in the magnitude of impedance in said output circuit from an oscillating to a non-oscillating condition, said oscillator circuit means comprising a tank circuit and a first controlled conduction device having a plurality of electrodes, said output circuit connected across a first pair of said electrodes, said feedback circuit connected across a second pair of said electrodes with said second pair including one of said first pair, said feedback circuit including a feedback capacitor serially connected to said tank circuit, said capacitor being selectively, mechanically variable over a range including one magnitude placing said oscillator circuit means into oscillation and another conductive condition placing said oscillator circuit means out of oscillation, switch circuit means responsive to said oscillator circuit means being in said one condition for being in one conductive condition and responsive to said oscillator circuit means being in said other condition for being in a different conductive condition, said switch circuit means being connected to said output circuit and being in said one conductive condition responsively to the impedance of said output circuit having one magnitude and being in said different conductive condition responsively to the impedance of said output circuit having a different magnitude and comprising a second controlled conduction device having a plurality of different electrodes, an input circuit connected across two of said different electrodes and connected to said output circuit of said oscillator circuit means, said switch means having a different output circuit connected across a different two of said different electrodes with said different two including one of said two of said different electrodes, whereby the conductive condition of said second controlled conduction device is controlled by changes in impedance of said output circuit of said oscillator circuit means with one of said conductive conditions being conduction and the other being nonconduction, said feedback capacitor comprising a pair of spaced plates with one of said plates being resiliently deflectable towards and away from the other of said plates whereby changes in magnitude of the capacity can be effectuated and actuating means comprising a plunger member selectively movable between two positions and engageable with said one of said plates for deflecting said one of said plates toward and away from said other of said plates as said plunger member is moved between said positions.

12. The switch of claim 11 with said plunger member being spring biased to normally be in one of said positions.

13. The switch of claim 11 with said switch circuit means comprising a third controlled conduction device similar to said second controlled conduction device and being electrically connected to said different output circuit and being in conductive conditions responsively to and inversely to the conductive condition of said second controlled conduction device.

14. The switch of claim 11 with said tank circuit tuned to provide oscillations at least as high as approximately two megacycles.

References Cited

UNITED STATES PATENTS 1,977,414 3/1961 Adler et al. ---------- 331—173

OTHER REFERENCES

C. P. Barnard, "Radio Frequency Oscillator Circuit Breaker," IBM Technical Disclosure Bulletin, vol. 5, July 1962, p. 30.

ROY LAKE, *Primary Examiner.*

S. H. GRIMM, *Assistant Examiner.*

U.S. DEPARTMENT OF COMMERCE

PATENT OFFICE

Washington, D.C. 20231

UNITED STATES PATENT OFFICE

CERTIFICATE OF CORRECTION

Patent No. 3,402,363 September 17, 1968

Lee D. Johnson

It is certified that error appears in the above identified patent and that said Letters Patent are hereby corrected as shown below:

Column 6, line 60, "1,977,414" should read -- 2,977,414 --.

Signed and sealed this 27th day of January 1970.

(SEAL)
Attest:

Edward M. Fletcher, Jr.
Attesting Officer

WILLIAM E. SCHUYLER, JR.
Commissioner of Patents